(12) United States Patent
Huang et al.

(10) Patent No.: US 7,543,972 B2
(45) Date of Patent: Jun. 9, 2009

(54) BACKLIGHT MODULE HAVING PLURAL LIGHT GUIDE SETS

(75) Inventors: Chien-Chih Huang, Tainan (TW); Ying-Chieh Tsai, Tainan (TW)

(73) Assignee: Chi Mei Optoelectronics Corp. (TW)

( * ) Notice: Subject to any disclaimer, the term of this patent is extended or adjusted under 35 U.S.C. 154(b) by 0 days.

(21) Appl. No.: 11/800,194

(22) Filed: May 4, 2007

(65) Prior Publication Data
US 2007/0258267 A1 Nov. 8, 2007

(30) Foreign Application Priority Data
May 4, 2006 (TW) .............................. 95115950 A

(51) Int. Cl.
*F21V 7/04* (2006.01)
(52) U.S. Cl. .................. 362/616; 362/610; 362/617; 362/619; 362/620
(58) Field of Classification Search ................. 362/610, 362/616–620
See application file for complete search history.

(56) References Cited

U.S. PATENT DOCUMENTS

| | | | |
|---|---|---|---|
| 6,464,366 B1 * | 10/2002 | Lin et al. | 362/616 |
| 6,540,368 B2 * | 4/2003 | Akaoka | 362/610 |
| 2005/0100282 A1 * | 5/2005 | Okada et al. | 385/46 |
| 2007/0171330 A1 * | 7/2007 | Hung et al. | 349/65 |

OTHER PUBLICATIONS

C.P. Hung et al., U.S. Appl. No. 11/657,924, entitled "Providing Light Guide Elements in a Backlight Module," filed Jan. 25, 2007, pp. 1-20, Figs. 1-5.

* cited by examiner

*Primary Examiner*—Sandra L O'Shea
*Assistant Examiner*—James W Cranson
(74) *Attorney, Agent, or Firm*—Trop, Pruner & Hu, P.C.

(57) ABSTRACT

A backlight module includes a light guide plate, which includes a substrate and at least two light guide sets formed on a surface of the substrate. Each light guide set includes a plurality of light guide elements, with the light guide elements including emission surface structures to emit light, and the emission surface structures of the light guide elements of one of the light guide sets being different from the emission surface structures of the light guide elements of another one of the light guide sets.

26 Claims, 11 Drawing Sheets

BACKLIGHT MODULE HAVING PLURAL LIGHT GUIDE SETS

CROSS-REFERENCE TO RELATED APPLICATION

This claims priority under 35 U.S.C. § 119 of Taiwan patent application No. 095115950, filed May 4, 2006, which is hereby incorporated by reference.

TECHNICAL FIELD

The present invention relates to a backlight module having plural light guide sets to provide multiple light-extracting directions.

BACKGROUND

In typical liquid crystal displays (LCDs), the light-extracting directions of backlight sources are usually constant, and the light-extracting distribution is maintained within some particular range, such as shown in FIG. 1, which shows luminance of a backlight source as a function of angle. The light-extracting direction of a backlight source refers to the general direction in which light is emitted (extracted) from the light source. A light-extracting distribution refers to range of angles over which light is emitted (extracted) from the light source, where the luminance of the light in this range of angles is greater than some threshold. The light-extracting distribution according to FIG. 1 can result in lack of variation of the functions of LCDs, which can reduce display quality (such as for dynamic display) and degrade contrast.

One conventional type of backlight module used with LCDs has a dual-direction light-extracting feature that adds variety to the functions of LCDs. FIG. 2 shows a conventional dual-direction light-extracting backlight module 10, which includes a first light guide set 12 and a second light guide set 14 arranged in a stacked manner (the first light guide set 12 stacked over the second light guide set 14). In addition, an optical film set 24 is stacked over the light guide set 12. The light guide sets 12, 14 respectively include light guide plates 20, 22, light sources 16, 18, and reflection sheets 26, 28. The light source 16 is disposed on one side (left side in FIG. 2) of the light guide plate 20, while the light source 18 is disposed on one side (right side) of the light guide plate 22. Moreover, the reflection sheets 26, 28 are respectively disposed on the opposite sides of corresponding light guide plates 20, 22 (opposite to the sides where the light sources 16, 18 are disposed).

The light guide sets 12, 14 of the backlight module 10 can provide two light-extracting directions (as indicated by the two crossed arrows). However, such a dual-direction light-extracting backlight module 10 has disadvantages including an asymmetric light-extracting distribution, poor transmittance and high manufacturing complexity, and the backlight module 10 cannot provide sufficient display function variety to fulfill various function requirements of existing display devices on the market since only two particular light-extracting direction ranges are provided by the backlight module 10. Furthermore, the light guide set 12 and the light guide set 14 are stacked on one another, so that the light extraction of the underlying light guide set 14 is affected by the light extraction of the overlying light guide set 12.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

In accordance with some embodiments, a backlight module has a light source with a modifiable characteristic that can be provided to add function variety for a display device, such as a liquid crystal display (LCD) device. The modifiable characteristic includes geometries of emission surface structures on light guide elements of the backlight module, and/or activation/deactivation of a light source.

Figure 1:
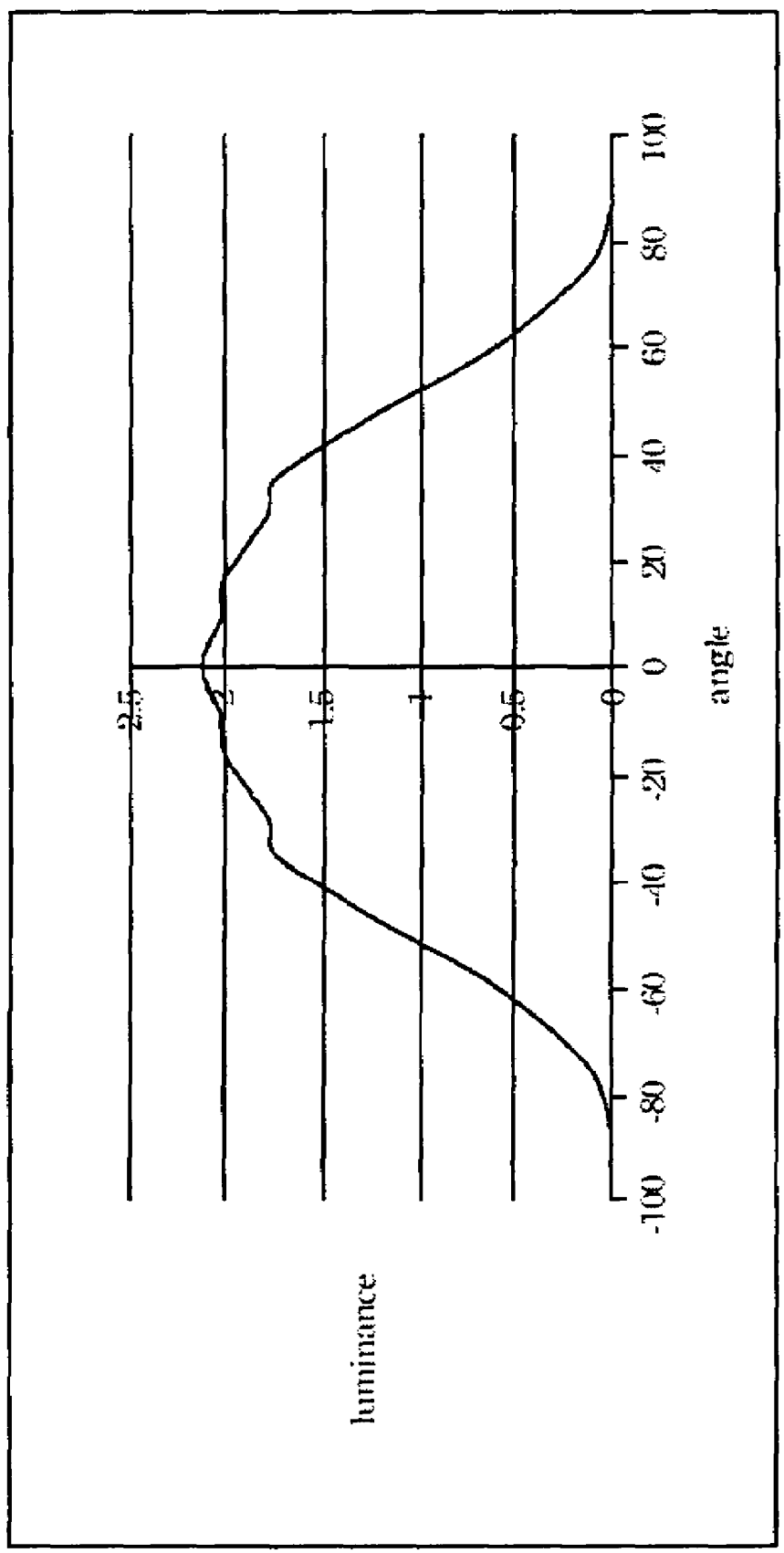
FIG. 1 is a graph illustrating a light-extracting distribution of a conventional display device.
Figure 2:
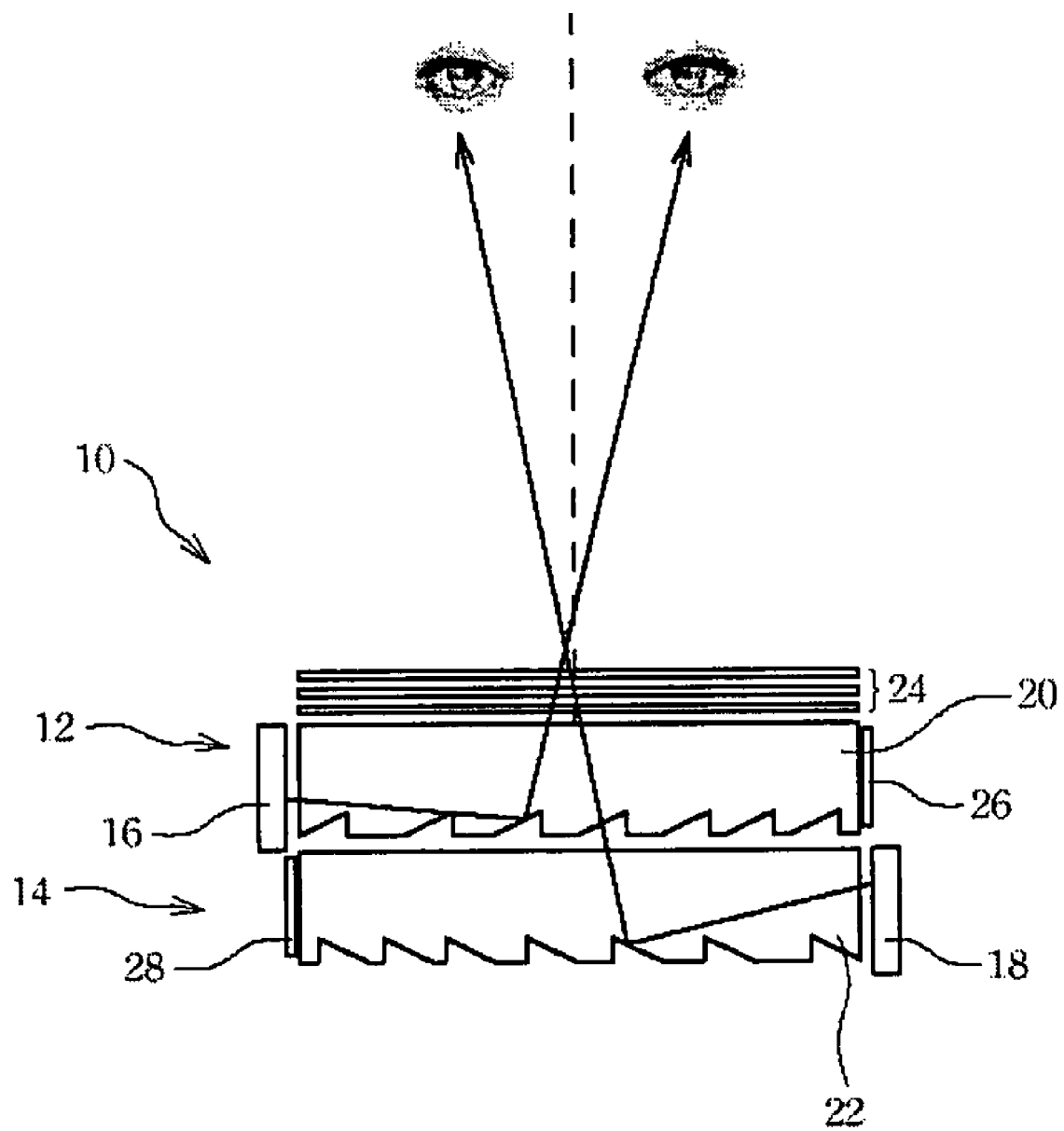
FIG. 2 is a side view of a conventional dual-direction light-extracting backlight module.
Figure 3A:
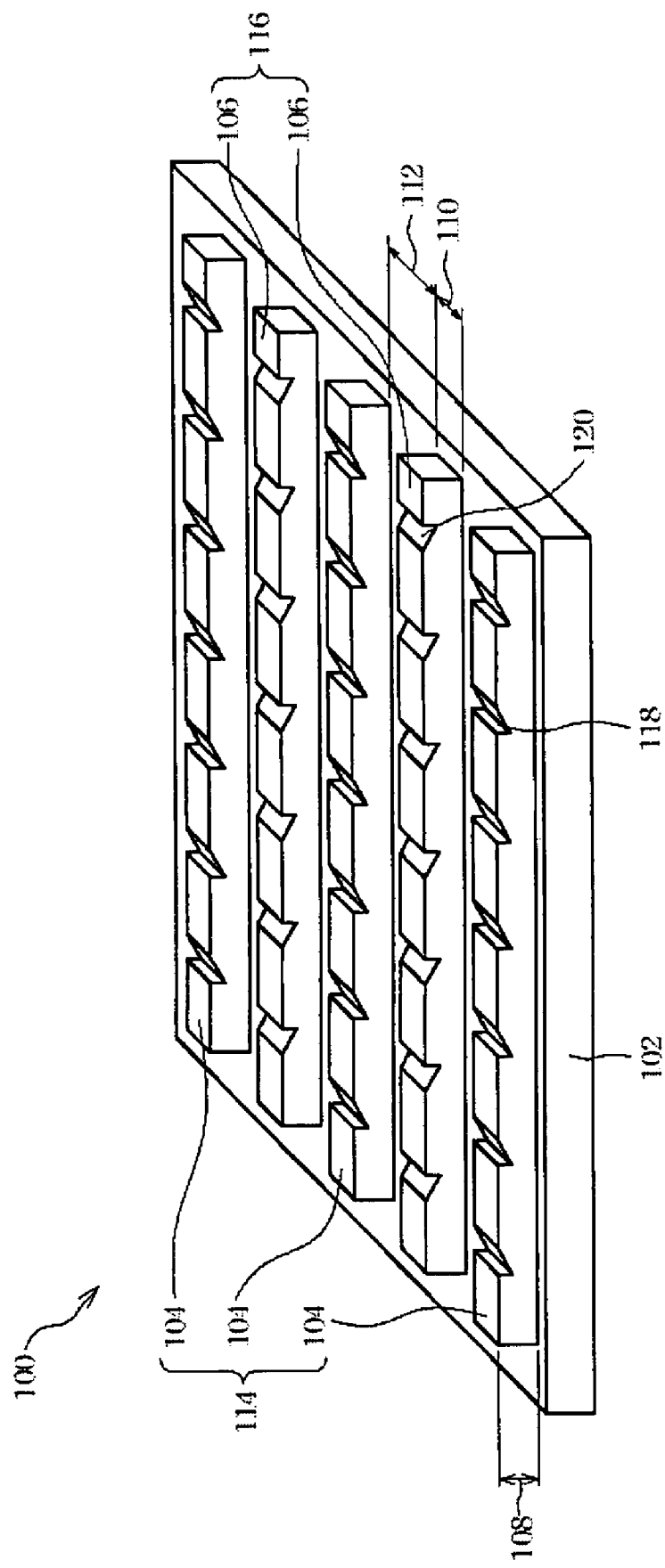
FIG. 3A is a perspective view of a light guide plate of a backlight module in accordance with an embodiment.

FIG. 3A is a perspective view of a light guide plate 100 of a backlight module in accordance with an embodiment of the present invention. The backlight module generally includes the light guide plate 100 and at least one light source (not shown), which can be used to provide backlight for an LCD device, for example. The light guide plate 100 includes a substrate 102 on which are formed at least two light guide sets 114 and 116. The light guide set 114 includes a plurality of elongate light guide elements 104, and the light guide set 116 includes a plurality of elongate light guide elements 106. The light guide elements 104 and 106 are arranged in an alternating manner such a given light guide element 104 is between two successive light guide elements, and a given light guide element 106 is between two successive light guide elements 104. In one example, the light guide elements 104 and 106 may be directly formed and fixed to a surface of the substrate 102 by, for example, a mold pressing technique. The substrate 102 may be a film, and the substrate 102 can be formed of a flexible material, such as a plastic material, where the plastic material may be PET (polyethylene terephthalate, which is a thermoplastic polymer resin) or PMMA (polymethyl methacrylate, which is a synthetic polymer). The substrate 102 may also include glass or a reflection sheet (having a light reflection property), such as a reflection diffusion sheet or a silver reflection sheet.

The light guide elements 104 and 106 can be composed of an optical fiber material to transmit light. Light in the light guide elements 104, 106 is transmitted by a total reflection method, where light transmitted through the elongate light guide element is reflected by the inner walls of the light guide element as the light traverses along the elongate light guide element. As a result, the light guide elements 104, 016 have high transmission efficiency. In one example, a gap 112 between adjacent light guide elements 104 and 106 is less than about 100 μm (micrometers). In another example, the gap 112 is less than about 50 μm. In an example, a height 108 of each light guide element 104 and 106 is about 250 μm, and a width 110 of each light guide element 104 and 106 is also about 250 μm. In other implementations, other heights 108 and widths 110 can be used.

In addition, a diffusive sheet (not shown) may be selectively disposed on the light guide plate 100, where the diffusive sheet is an anisotropic diffusive sheet to enhance the uniformity of the axial light of the backlight module.

The light guide elements 104 and 106 are directly formed on the substrate 102 so that the light guide elements 104 and 106 with smaller sizes can be formed to reduce the thickness of the light guide plate 100 to the micrometer range. This is compared to a conventional light guide plate having a thickness in the millimeter range. As a result, the light guide plate 100 can be effectively miniaturized in accordance with some embodiments, which can be beneficially used with various designs of back light sources with various functions.

Figure 3B:
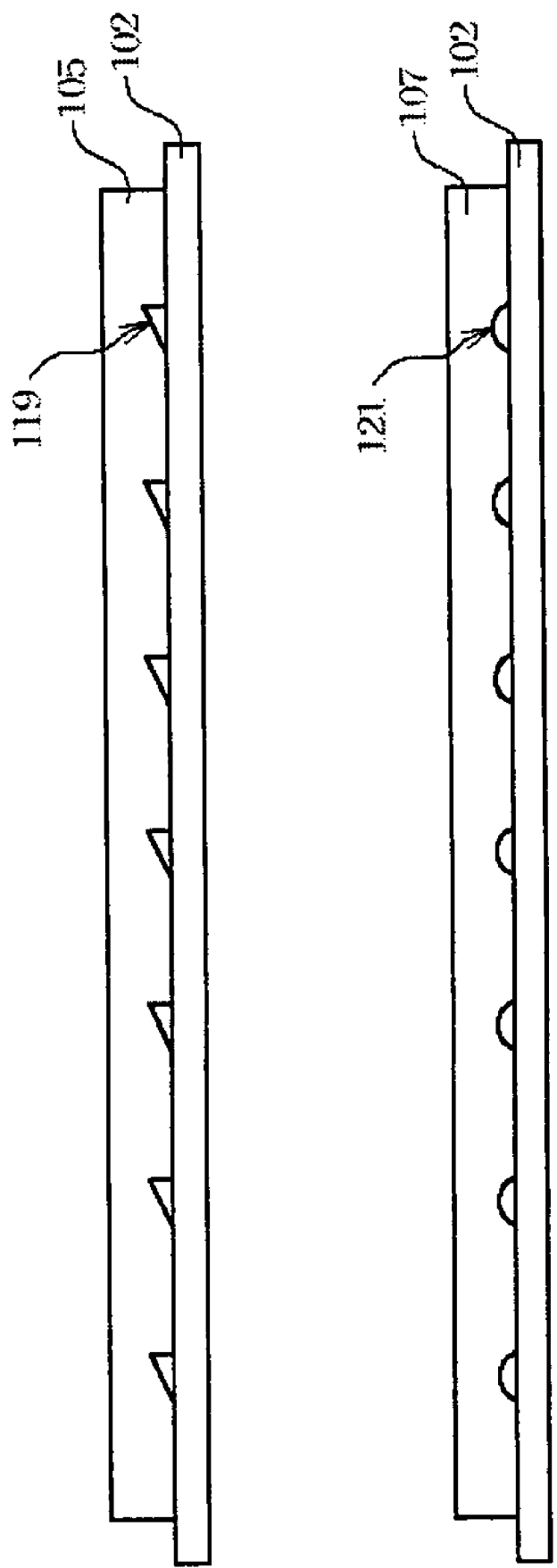
FIG. 3B is a cross-sectional view of a light guide plate of a backlight module in accordance with another embodiment.

At least one emission surface structure, such as at least one dot pattern or at least one cut portion, is formed on an upper surface and/or a lower surface at a particular light emission location of each light guide element 104 or 106 by, for example, a micro-machining process. The emission surface structure allows for emission of light from inside a light guide element 104 or 106 to outside the light guide element. In the example of FIG. 3A, cut portions 118 and 120 (or dot patterns) can be respectively provided on the upper surfaces of respective light guide elements 104 and 106. Alternatively, as shown in FIG. 3B, cut portions 119 and 121 (or dot patterns) can be provided on the lower surfaces of respective light guide elements 105 and 107.

Figure 4:
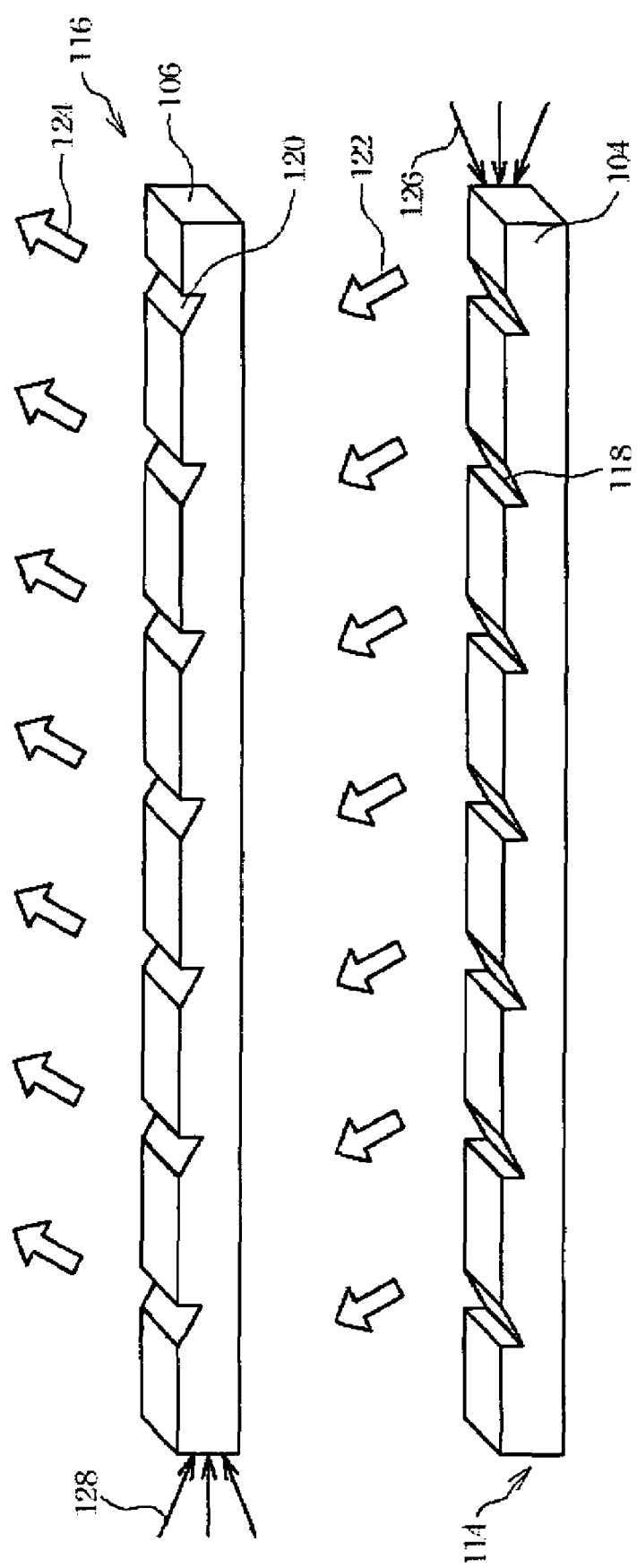
FIG. 4 illustrates light-extracting directions of light guide elements on a light guide plate of a backlight module in accordance with an embodiment.

In another embodiment, both the upper surface and the lower surface of a light guide element may be formed with at least one cut portion and at least one dot pattern. Also, at least one cut portion and at least one dot pattern may be provided on the upper surfaces of one set of the light guide elements, such as the light guide elements 104, and at least one cut portion and at least one dot pattern may be provided on the lower surfaces of the other set of the light guide elements, such as the light guide elements 106. As depicted in FIG. 4, the total reflection transmission of the light transmitted in the light guide elements 104 and 106 is interrupted by the emission surface structures, such as the cut portions 118 and 120 on the light guide elements 104 and 106, so that light 126 and 128 emitted into and transmitted in the light guide elements 104 and 106, respectively, can be emitted from (extracted from) the light guide elements 104 and 106 through the emission surface structures as light 122 and 124, respectively. The emitted light 122 and 124 provides the display surface with light. The light 126, 128 emitted into the light guide elements 104 and 106 are provided by respective light sources (or a common light source).

By using the transmission property of the light guide elements 104 and 106, the cut portions 118 and 120 (or other emission surface structures) can be selectively designed to have different geometric shapes for different light guide sets 114 and 116 to allow for control of emission of the light 122 and 124 from the light guide elements 104 and 106. For example, in FIG. 4, light 122 emitted from light guide element 104 in the light guide set 114 is emitted in a first, angled general direction, whereas light 124 emitted from the light guide element 106 in the light guide set 116 is emitted in a second, different, angled general direction. The first and second general directions of respective emitted light 122 and 124 are referred to as light-extracting directions from the light guide elements.

In the light guide plate according to some embodiments, the light-extracting direction of the light guide elements of each light guide set is different from the light-extracting direction of the light guide elements of another light guide set. In an embodiment, the directions of the emitted light 122 of the plural light guide elements 104 in the light guide set 114 are the same, and the directions of the emitted light 124 of the plural light guide elements 106 in the light guide set 116 are the same. Accordingly, the light guide sets 114 and 116 can respectively provide different light-extracting distributions to fulfill various functional requirements of the corresponding display device.

A display device, such as an LCD device, usually includes a backlight module to emit light towards a display panel disposed adjacent the backlight module. Therefore, a backlight module with a particular function can be formed by appropriately equipping the light guide sets with different light-extracting distributions, so as to allow a display device including the backlight module to have various functions.

Figure 5A:
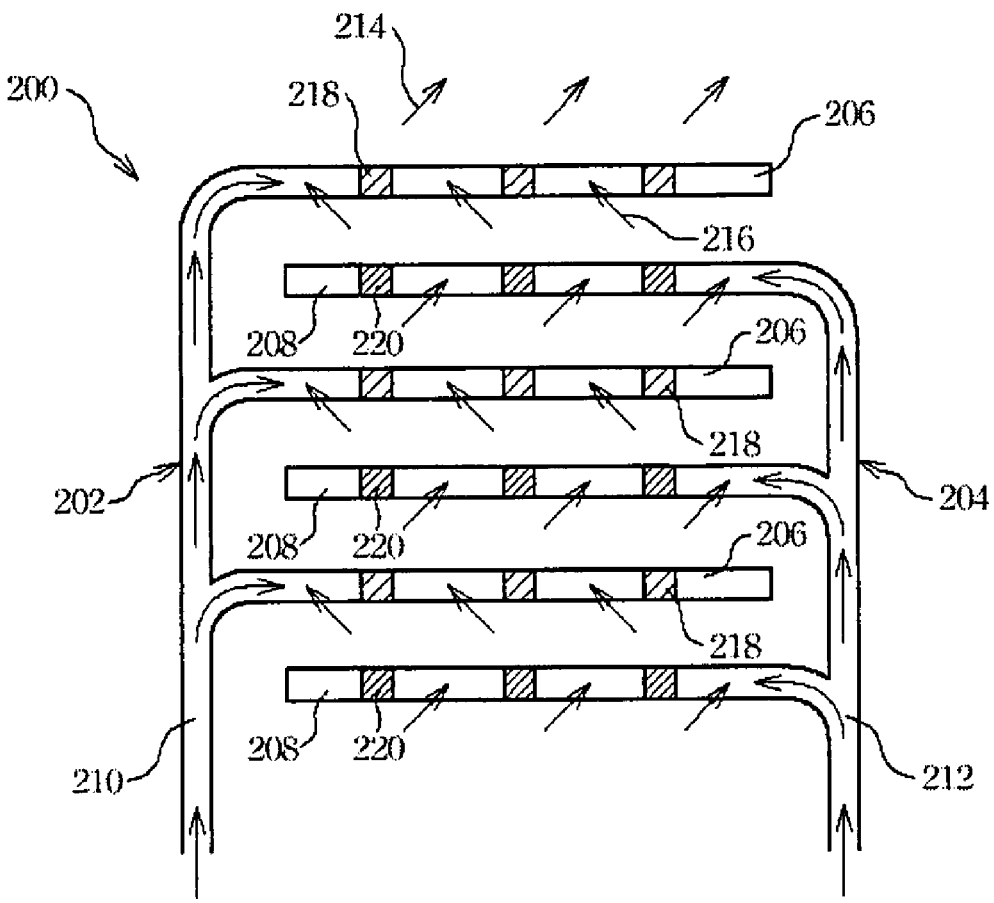
FIG. 5A is a top view of an assembly of light guide sets of a backlight module of a display device in accordance with an embodiment.

FIG. 5A illustrates an assembly of light guide sets of a backlight module 200 of a display device, in accordance with an embodiment. The backlight module 200 includes a light guide plate (not shown) having at least two light guide sets 202 and 204 formed on the substrate, where the light guide sets 202 and 204 are respectively composed of a plurality of light guide elements 206 and 208. The light guide elements 206 and 208 are arranged in an alternating manner so that a given light guide element 206 is between two successive light guide elements 208, and a given light guide element 208 is between two successive light guide elements 206. Each light guide element 206 is provided with at least one emission surface structure 218, and each light guide element 208 is also provided with at least one emission surface structure 220, where the emission surface structures 218 and 220 may be cut portions and/or dot patterns, and the geometric shape of the emission surface structure 218 is different from that of the emission surface structure 220 to provide the light guide elements 206 and 208 with different light-extracting directions 214 and 216 (as indicated by arrows in FIG. 5A). As a result, the light guide sets 202 and 204 produce different light-extracting distributions.

In the present exemplary embodiment, the light guide sets 202 and 204 may be associated with separate light sources, or may be associated with a common light source. When the light guide sets 202 and 204 are associated with separate light sources, the light sources may have separate power sources or may have a common power source. The backlight module 200 further includes at least two optical fiber sets 210 and 212 respectively corresponding to the light guide sets 202 and 204. The light emitted by the light source is transmitted into the light guide elements 206 of the light guide set 202 and the light guide elements 208 of the light guide set 204. In an exemplary embodiment, the light source can be a light-emitting diode (LED) or a laser diode (LD).

Figure 5B:
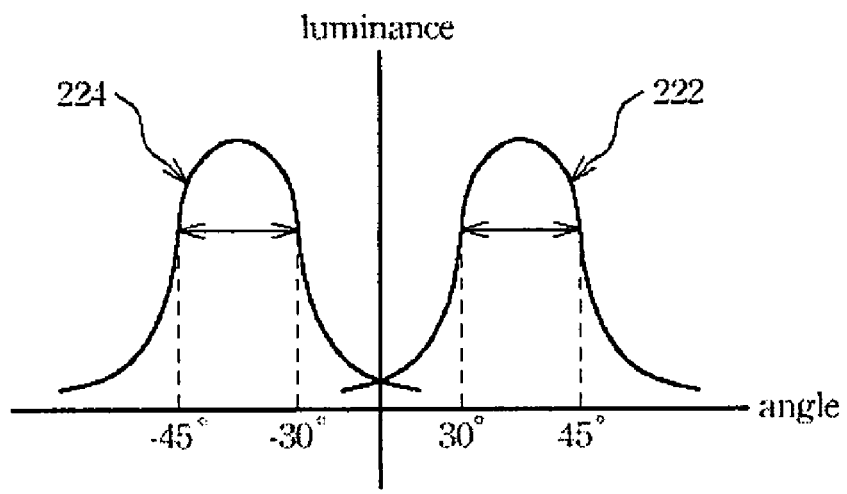
FIG. 5B is a graph depicting a light-extracting distribution of a backlight module of a display device in accordance with an embodiment.
Figure 5C:
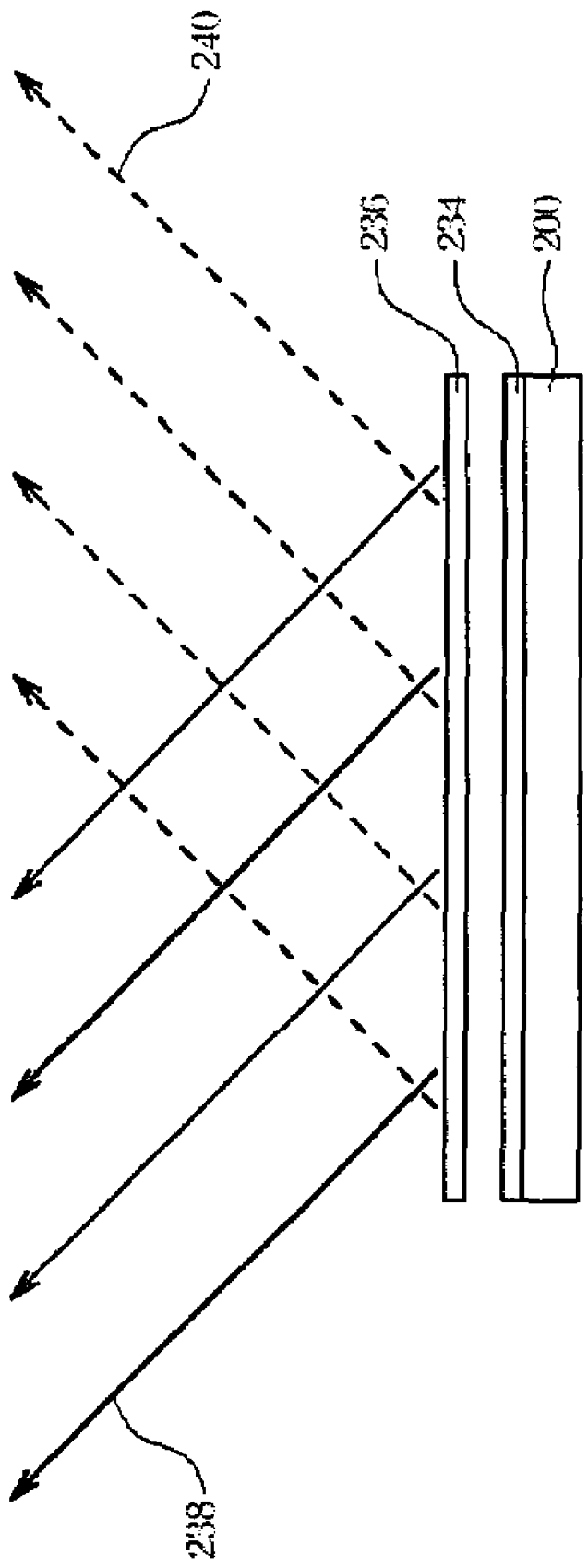
FIG. 5C illustrates light-extracting directions of a backlight module of a display device in accordance with an embodiment.

By selecting the geometric shapes of the surface structures 218 of the light guide elements 206 and the geometric shapes of the surface structures 220 of the light guide elements 208, the light-extracting distributions of the light guide sets 202 and 204 can be controlled to provide a display device with various functions. For example, when an angle (as represented by a light-extracting distribution 222 in FIG. 5B) of the light guide set 202 is between about 30° and about 45°, and an angle (as represented by a light-extracting distribution 224 in FIG. 5B) of the other light guide set 204 is between about −30° and about −45°, the display device has two extracted lights 238 and 240 that are emitted in two different general directions (each "general direction" is within the respective range of angles in FIG. 5B, e.g., a first range of 30° to 45° and a second range of −30° to −45°), and the display device has a dual-screen function. The dual-screen function is able to provide for the display of two screens by the display device, where the two screens can show two different frames, such as depicted in FIG. 5C. A light-extracting distribution refers to range of angles over which light is emitted (extracted) from the light source (in this case light guide elements), where the luminance of the light in this range of angles is greater than some threshold.

The display device of FIG. 5C includes the backlight module 200 and a display panel 236 stacked over the backlight module 200. The backlight module 200 further includes an optical film set 234 to increase the illuminant effect of the backlight module 200. In another embodiment, more than two light guide sets may be provided to allow the display device have multiple-screen (two or more screens) display function.

Figure 5D:
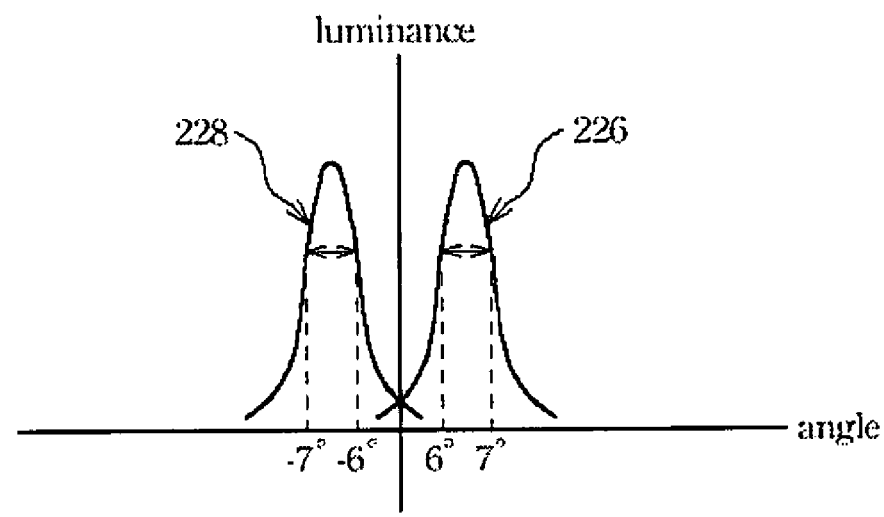
FIG. 5D is a graph depicting a light-extracting distribution of a backlight module of a display device in accordance with another embodiment.

In another exemplary application, when a display device has a display size of 2.2 inches and a view distance of 30 cm is provided, the angle according to the light-extracting distribution 226 of the light guide set 202 is between about 6° and about 7°, and the angle according to the light-extracting distribution 228 of the light guide set 204 is between about −6° and about −7°, such as shown in FIG. 5D. The light-extracting distributions 226 and 228 are respectively seen by a right eye and a left eye of a viewer. As a result, the right eye and the left eye of the viewer see different pictures on the display device, so that the viewer feels that the display frame has a three-dimensional effect to make the display device have a three-dimensional display function.

Figure 5E:
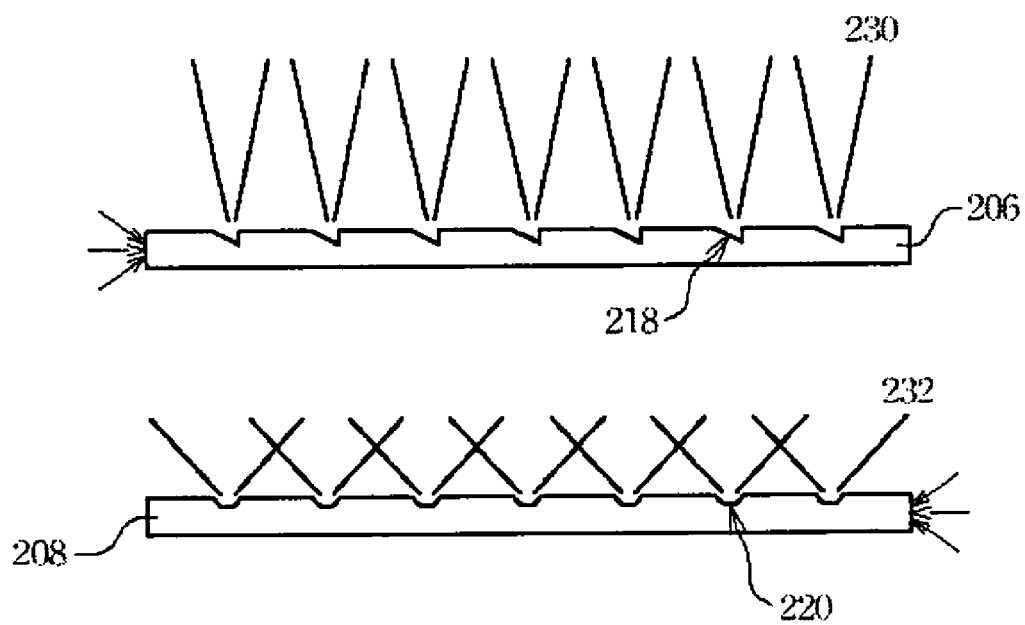
FIG. 5E illustrates light-extracting directions of two light guide elements of a backlight module of a display device in accordance with another embodiment.
Figure 5F:
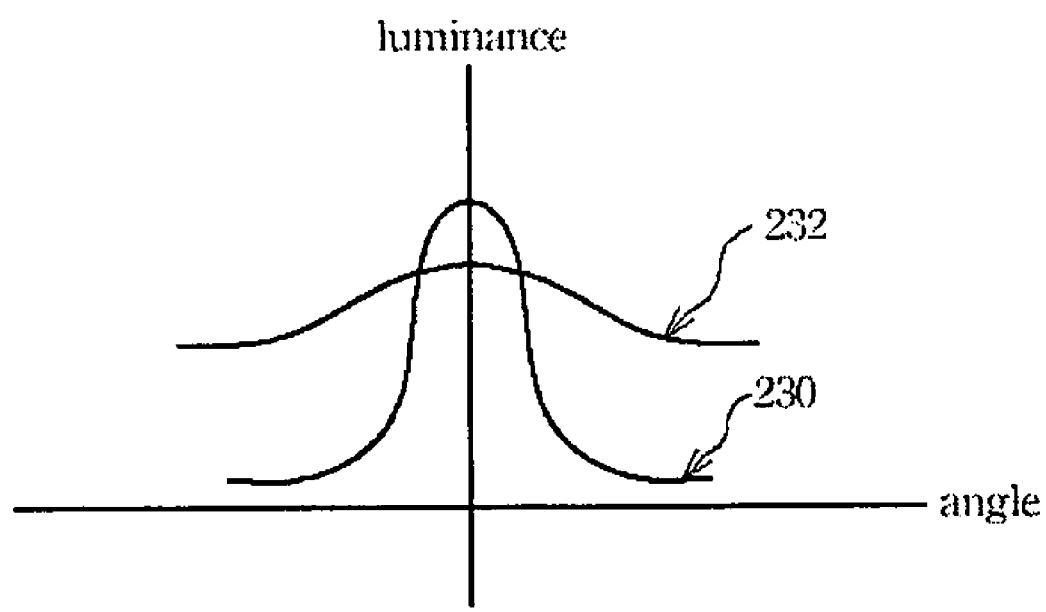
FIG. 5F is a graph depicting the light-extracting distributions of two light guide elements of a backlight module of a display device in accordance with another embodiment.

In another embodiment, the light guide sets 202 and 204 have corresponding separate light sources, and the light sources have separate power sources. As shown in FIG. 5E, the geometric shapes of the emission surface structures 218 of the light guide elements 206 of the light guide set 202 are selected to be cut portions having a cross-section with an acute angle. The geometric shapes of the emission surface structures 220 of the light guide elements 208 of the light guide set 204 are selected to be cut portions having a cross-section that is generally bowl-shaped. As a result, the range of the emitted or extracted light (230) of the light guide set 202 is narrower than the range of the emitted or extracted light (232) of the light guide set 204. The corresponding extracted-light distributions 230 and 232 are shown in FIG. 5F. Accordingly, a display device with a display function of different visual angles switching can be provided. For example, when the power source of the corresponding light source of the light guide set 202 is turned on, and the power source of the corresponding light source of the light guide set 204 is turned off, the screen of the display device is at a narrow visual angle display state (in other words, the display device has a narrow viewing angle); however, when the power source of the corresponding light source of the light guide set 202 is turned off, and the power source of the corresponding light source of the light guide set 204 is turned on, the screen of the display device is at a wide visual angle display state (in other words, the display device has a wide viewing angle).

Figure 6:
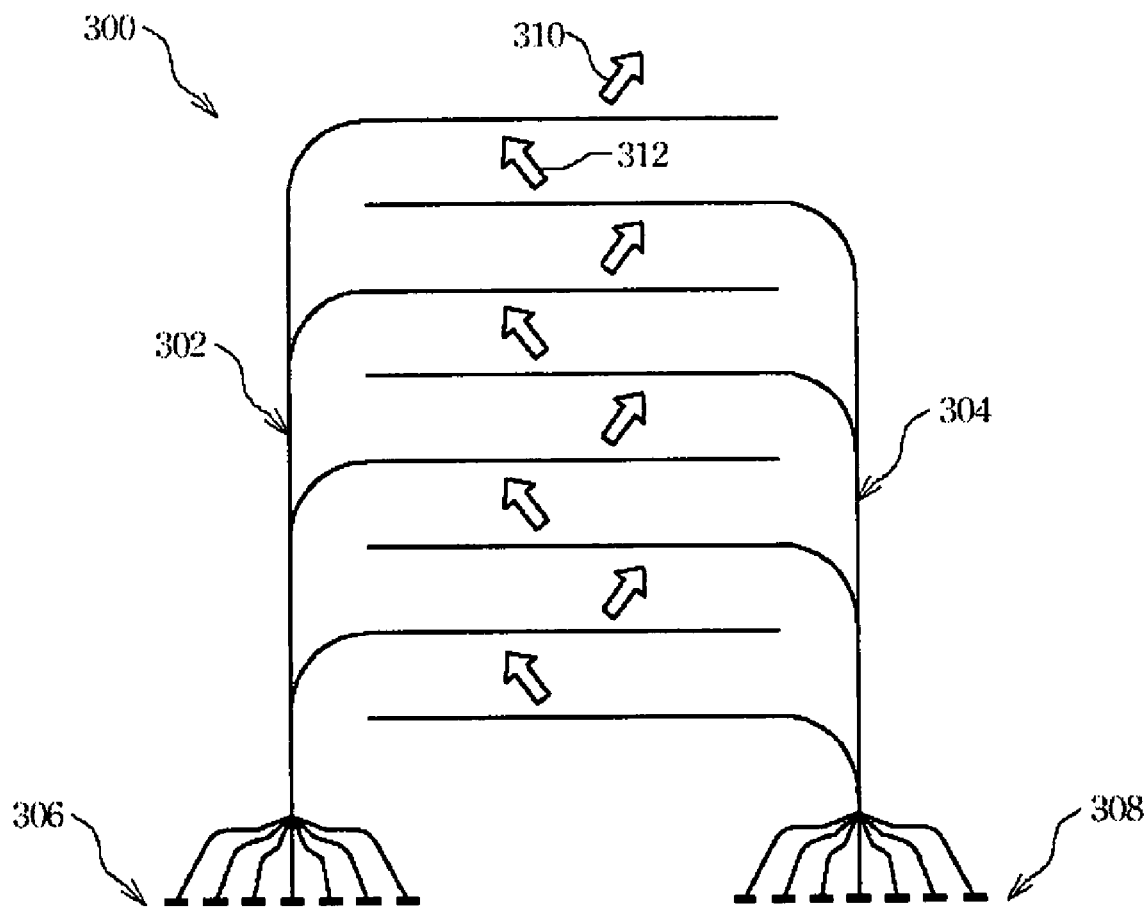
FIG. 6 is a top view of an assembly of light guide sets of a backlight module of a display device in accordance with yet another embodiment.

FIG. 6 illustrates an assembly of light guide sets of a backlight module 300 of a display device in accordance with another embodiment. A light guide plate of the backlight module 300 includes two light guide sets 302 and 304. The light guide sets 302 and 304 respectively include a corresponding light source set 306 and a corresponding light source set 308. The light source sets 306 and 308 are capable of operating independently to respectively provide the light guide sets 302 and 304 with light. The light guide sets 302 and 304 have different light-extracting directions 310 and 312 by designing the emission surface structures of the light guide elements of the light guide sets 302 and 304. Therefore, the light source sets 306 and 308 can be respectively controlled (activated or de-activated) to modify the light-extracting direction distribution by independently controlling on/off switches of the power sources of the light source sets 306 and 308.

Figure 7:
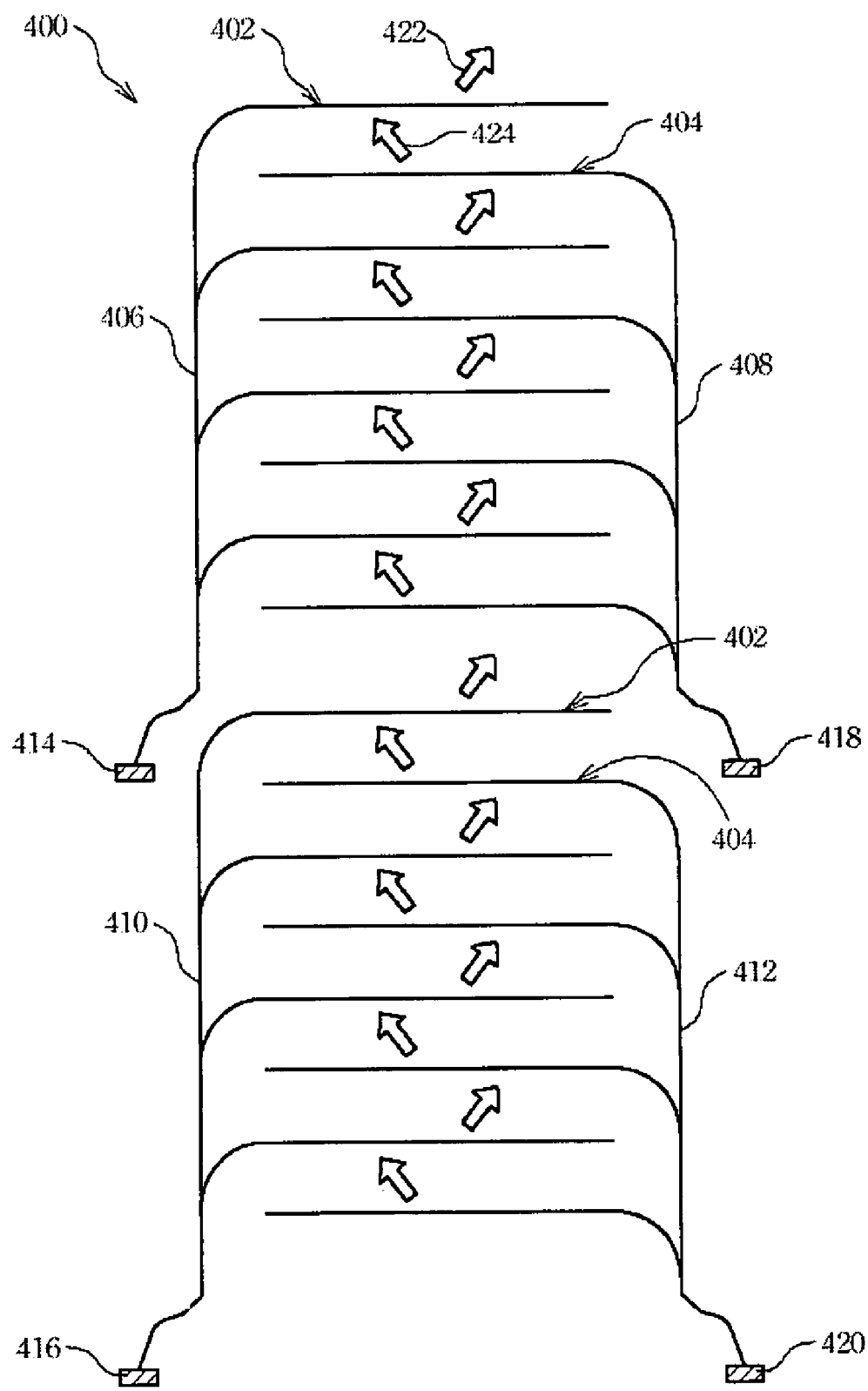
FIG. 7 is a top view of an assembly of light guide sets of a backlight module of a display device in accordance with still another embodiment.

FIG. 7 illustrates an assembly of light guide sets of a backlight module 400 of a display device in accordance with yet another embodiment. In an exemplary embodiment, light guide sets 402 and 404 of a backlight module 400 may respectively correspond to at least two optical fiber sets 406 and 410 and at least two optical fiber sets 408 and 412. The optical fiber sets 406, 410, 408 and 412 respectively correspond to separate light sources 414, 416, 418 and 420. The light guide sets 402 and 404 have different light-extracting directions 422 and 424 by selecting different geometries for the emission surface structures of the light guide elements of the light guide sets 402 and 404. Furthermore, the light sources 414, 416, 418 and 420 can be controlled (activated or deactivated) by independently controlling on/off switches of the power sources of the light sources 414, 416, 418 and 420.

The FIG. 7 embodiment includes more regions, which are capable of lighting up independently, so that a scanning effect provided by different optical distributions in the multiple regions is achieved. Therefore, the backlight module 400 of the FIG. 7 embodiment is suitable for a scanning backlight module or a dynamic backlight module, and has a superior capability to enhance the dynamic contrast and dynamic image quality to improve dynamic contrast, and thus to enhance the dynamic image quality and to achieve a display device with good display quality.

According to the aforementioned description, a benefit according to some embodiments is that light guide elements shaped like optical fibers can be used, so that a light guide plate with a small gap can be provided, and the light-mixing distance required by the backlight module can be reduced, thereby effectively decreasing the thickness of the backlight module to further reduce the size of a display device.

Another benefit according to some embodiments is that a light guide plate of a backlight module can be fabricated by alternately disposing light guide elements including emission surface structures with different geometric shapes so that the backlight module can achieve the expected light-extracting direction distribution to achieve various desired characteristics and display device functions, and to provide greater flexibility.

Still another benefit according to some embodiments is that the light-extracting distributions of a backlight module can be modified, so that the backlight module can be applied to display techniques including multiple-screen display, three-dimensional display, visual angle switching display, scanning display and dynamic display to provide display devices having various display functions.

Yet another benefit according to some embodiments is that a backlight module can provide a backlight source with a modifiable light-extracting distribution, so that the display device has functions including multiple-screen display, three-dimensional display, and visual angle switching display. Furthermore, by controlling power sources of the light sources in respective regions in the backlight module, a scanning display effect or a dynamic display effect can be achieved to further provide a display device with higher quality display capability.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A backlight module, comprising:
    a light guide plate comprising:
        a substrate having plural surfaces; and
        at least two light guide sets formed on one of the plural surfaces of the substrate, wherein each light guide set comprises a plurality of light guide elements, the light guide elements including emission surface structures to emit light, arid the emission surface structures of the light guide elements of a first of the light guide sets are different from the emission surface structures of the light guide elements of a second of the light guide sets,
        wherein the different emission surface structures enable the light guide sets to provide different light-extracting distributions.

2. The backlight module according to claim 1, wherein the substrate is a reflection sheet with a light reflection property.

3. The backlight module according to claim 1, wherein the light guide elements of the at least two light guide sets are arranged in an alternating manner such that a given light guide element of the first light guide set is between successive light guide elements of the second light guide set, and a given light guide element of the second light guide set is between successive light guide elements of the first light guide set.

4. The backlight module according to claim 1, wherein the emission surface structures of the light guide elements include at least one of cut portions and dot patterns.

5. The backlight module according to claim 1, wherein the emission surface structures are provided on at least one of upper surfaces and lower surfaces of the light guide elements.

6. The backlight module according to claim 1, further comprising at least one light source and at least two optical fiber sets respectively disposed between the light guide sets and the at least one light source to provide the light guide sets of the light guide plate with light.

7. The backlight module according to claim 1, further comprising at least two light sources and at least two optical fiber sets, wherein each light guide set corresponds to one of the light sources and one of the optical fiber sets, and each optical fiber set is disposed between the corresponding light guide set and the corresponding light source to enable the light sources respectively to provide the light guide sets with light.

8. The backlight module according to claim 1, further comprising a plurality of light sources and a plurality of optical fiber sets, wherein each light guide set corresponds to at least two of the light sources and at least two of the optical fiber sets, and the optical fiber sets are disposed between the corresponding light guide set and the corresponding light sources to enable the light sources respectively to provide the light guide sets with light.

9. The backlight module of claim 1, wherein the emission surface structures of the light guide elements of the first light guide set emit light according to a first light-extracting direction, and wherein the emission surface structures of the light guide elements of the second light guide set emit light according to a second, different light-extracting direction, wherein the first light-extracting direction comprises a first general direction angled with respect to the one surface of the substrate, and the second light-extracting direction comprises a second general direction angled with respect to the one surface of the substrate.

10. The backlight module of claim 9, wherein portions of the emission surface structures of the first light guide set face in the first general direction, and portions of the emission surface structures of the second light guide set face in the second general direction.

11. The backlight module of claim 1, wherein the one surface on which the at least two light guide sets are formed is to generally face a display panel that receives light emitted by the light guide sets.

12. A display device, comprising:
    a backlight module having a light guide plate, the light guide plate comprising:
        a substrate having plural surfaces; and
        at least two light guide sets formed on one of the plural surfaces of the substrate, wherein each light guide set comprises a plurality of light guide elements, the light guide elements include emission surface structures for emitting light, and the emission surface structures of the light guide elements of a first of the light guide sets being different from the emission surface structures of the light guide elements of a second of the light guide sets, wherein the different emission surface structures enable the light guide sets to provide different light-extracting distributions; and
    a display panel positioned adjacent the backlight module to receive light from the backlight module.

13. The display device according to claim 12, wherein the light guide elements of the at least two light guide sets are arranged in an alternating manner such that a given light guide element of the first light guide set is between successive light guide elements of the second light guide set, and a given light guide element of the second light guide set is between successive light guide elements of the first light guide set.

14. The display device according to claim 12, wherein the emission surface structures of the light guide elements comprise at least one of cut portions and dot patterns.

15. The display device according to claim 12, wherein the display panel is a liquid crystal display panel.

16. The display device according to claim 12, wherein the backlight module further comprises:
    at least one light source; and
    at least two optical fiber sets respectively disposed between the light guide sets and the light source to provide the light guide sets of the light guide plate with light.

17. The display device according to claim 16, wherein an angle of the light-extracting distribution of the first of the light guide sets is between substantially 30° and substantially 45°, and an angle of the light-extracting distribution of the second of the light guide sets is between substantially −30° and substantially −45°.

18. The display device according to claim 16, wherein an angle of the light-extracting distribution of the first of the light guide sets is between substantially 6° and substantially 7°, and an angle of the light-extracting distribution of the second of the light guide sets is between substantially −6° and substantially −7°.

19. The display device according to claim 12, wherein the backlight module further comprises:
at least two light sources; and
at least two optical fiber sets, wherein each light guide set corresponds to one of the light sources and one of the optical fiber sets, and each optical fiber set is disposed between the corresponding light guide set and the corresponding light source to enable the light sources respectively to provide the light guide sets with light.

20. The display device according to claim 19, wherein the display device is one of a multiple-screen display device, a three-dimensional display device, a visual angle switching display device, and a scanning display device or a dynamic display device.

21. The display device according to claim 20, wherein in the multiple-screen display device, an angle of the light-extracting distribution of the first of the light guide sets is between substantially 30° and substantially 45°, and an angle of the light-extracting distribution of the second of the light guide sets is between substantially −30° and substantially −45°.

22. The display device according to claim 20, wherein in the three-dimensional display device, an angle of the light-extracting distribution of the first of the light guide sets is between substantially 6° and substantially 7°, and an angle of the light-extracting distribution of the second of the light guide sets is between substantially −6° and substantially −7°.

23. The display device according to claim 20, wherein in the visual angle switching display device, the range of the light-extracting direction distribution of the first of the light guide sets is larger than the range of the light-extracting direction distribution of the second of the light guide sets.

24. The display device of claim 12, wherein the one surface on which the at least two light guide sets are formed is to generally face the display panel.

25. The display device of claim 12, wherein the emission surface structures of the light guide elements of the first light guide set emit light according to a first light-extracting direction, and wherein the emission surface structures of the light guide elements of the second light guide set emit light according to a second, different light-extracting direction, wherein the first light-extracting direction comprises a first general direction angled with respect to the one surface of the substrate, and the second light-extracting direction comprises a second general direction angled with respect to the one surface of the substrate.

26. The display device of claim 25, wherein portions of the emission surface structures of the first light guide set face in the first general direction, and portions of the emission surface structures of the second light guide set face in the second general direction.

* * * * *

UNITED STATES PATENT AND TRADEMARK OFFICE
CERTIFICATE OF CORRECTION

PATENT NO. : 7,543,972 B2
APPLICATION NO. : 11/800194
DATED : June 9, 2009
INVENTOR(S) : Chien-Chin Huang et al.

Page 1 of 1

It is certified that error appears in the above-identified patent and that said Letters Patent is hereby corrected as shown below:

Column 7:
Line 35, "arid" should be --and--.
Line 52, "Thc" should be --The--.

Signed and Sealed this

Eighteenth Day of August, 2009

David J. Kappos
*Director of the United States Patent and Trademark Office*